No. 702,811. Patented June 17, 1902.
J. F. McCOY & T. N. GILMORE.
SANITARY RECEPTACLE AND CESSPOOL.
(Application filed Sept. 28, 1900.)
(No Model.) 2 Sheets—Sheet 1.
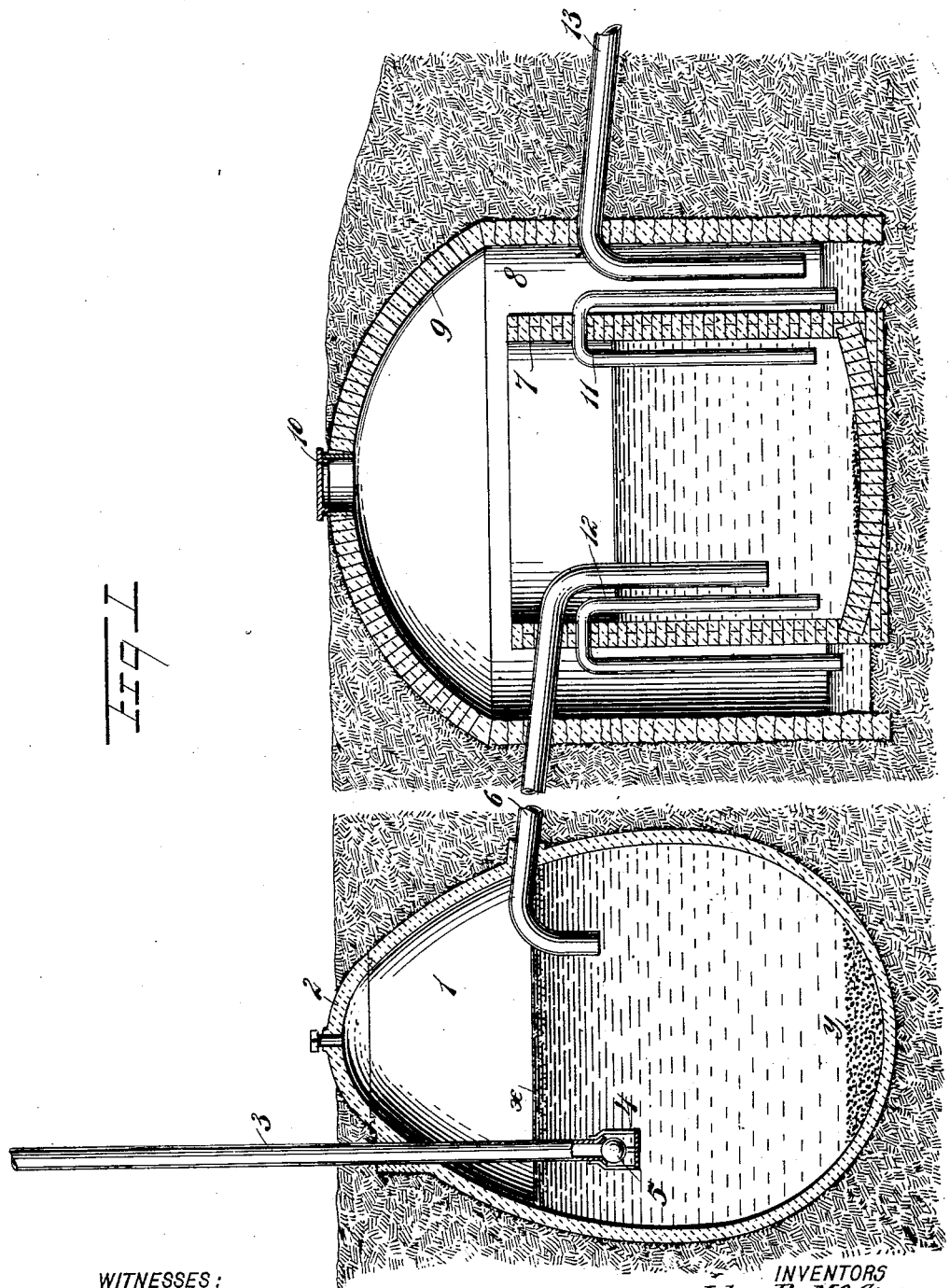
WITNESSES:
INVENTORS
John F. McCoy.
Thomas N. Gilmore.
BY
ATTORNEYS

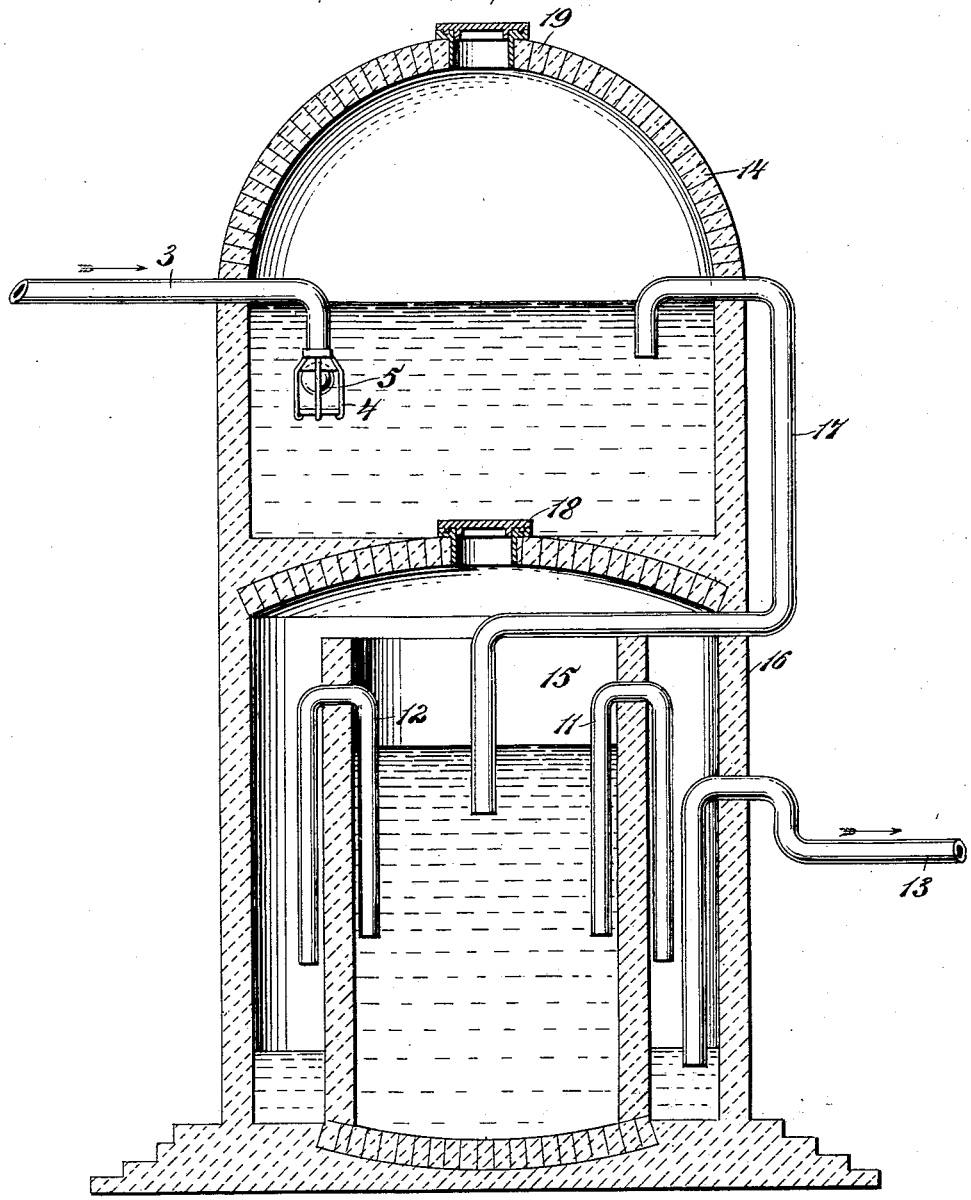

UNITED STATES PATENT OFFICE.

JOHN FRANCIS McCOY AND THOMAS NEELY GILMORE, OF NEW ORLEANS, LOUISIANA.

SANITARY RECEPTACLE AND CESSPOOL.

SPECIFICATION forming part of Letters Patent No. 702,811, dated June 17, 1902.

Application filed September 28, 1900. Serial No. 31,421. (No model.)

*To all whom it may concern:*

Be it known that we, JOHN FRANCIS McCOY and THOMAS NEELY GILMORE, citizens of the United States, and residents of New Orleans, in the parish of Orleans and State of Louisiana, have invented a new and Improved Sanitary Receptacle and Cesspool, of which the following is a full, clear, and exact description.

This invention relates to improvements in combined sanitary receptacles and cesspools; and the object is to provide a device of this character so arranged that solid matter discharging therein will be liquefied before passing into the earth.

We will describe a sanitary receptacle and cesspool embodying our invention and then point out the novel features in the appended claims.

Reference is to be had to the accompanying drawings, forming a part of this specification, in which similar characters of reference indicate corresponding parts in both the figures.

Figure 1 is a sectional elevation of a combined sanitary receptacle and cesspool embodying our invention, and Fig. 2 is a sectional elevation showing a modification.

Referring to Fig. 1 of the drawings, 1 designates a sanitary receptacle designed to be practically gas-tight and waterproof. It is placed in the ground and at its upper end has a manhole provided with a cover 2, that may be connected to the body portion in any suitable manner to prevent the escape of gas, and it is to be understood that the ammonia-gas and other material with the water or liquid contained in the retort shall act with the heat generated by putrefaction to disintegrate the solid matter, transforming it into a liquid. Leading into the receptacle 1 is an inflow-pipe 3, having at its end within the receptacle a valve-basket 4, within which is arranged a float-valve 5, designed to close the lower end of the pipe when the water shall reach a sufficient level or height, thus preventing the escape or return of gas through said pipe. The float-valve 5 will preferably be made hollow. The heavy vegetable matter and the like will float to the top of the liquid, as indicated at *x*, and any sand or loam will be deposited in the bottom of the retort, as indicated at *y*, from which it may be removed by any suitable means. The liquefied material will flow off through a pipe 6, which has its end within the retort extended below the liquid-level, into the chamber 7 of a cesspool consisting of a porous material—such, for instance, as porous brick— or it may be made of ordinary brick, with openings formed in the mortar while laying the same. Surrounding the chamber 7 is an outer chamber 8, also consisting of porous material, but provided with openings through which liquid may percolate or discharge to the earth. To facilitate this discharge to the earth, it will be noted that there is a ground surface between the lower end of the chamber 8 and the lower end of the chamber 7. The top of the chamber 8 is provided with an arched cover 9, having a manhole in which a cover 10 is placed in a practically air-tight manner. Siphon-pipes 11 and 12 lead from the interior of the chamber 7 to the space between said chamber 7 and the chamber 8. These siphons will operate to draw liquid from the bottom of the chamber 7, discharging it upon the ground between the two chambers 7 and 8. There may be several cesspools connected by pipes; but when only one is used, such as is shown in Fig. 1, a pipe 13 of porous material leads from the space between the chambers 7 and 8 of the cesspool into the ground and has a downward inclination. This pipe 13, acting as a strainer, will aid materially disintegrating the possible solid materials before discharging into the ground.

In Fig. 2 we have shown a sanitary receptacle 14 arranged above a cesspool or cesspools and consisting of the inner and outer sections 15 and 16. A feed-pipe 3, similar to the feed-pipe first described, leads into the receptacle 14 and has the same arrangement of valve at its lower end. From the receptacle 14 a discharge-pipe 17 leads into the inner chamber 15, and communication is provided between the inner chamber 15 and the space between the two chambers 15 and 16 by siphons 11 and 12, operating as before described. A porous discharge-pipe 13 also leads from this space. The top of the chamber 16 is provided with a manhole having a cover 18, and the top of the receptacle 14 is provided with a manhole having an air-tight cover 19.

In both examples of our improvement it will be noted that the sanitary receptacle connects directly with a cesspool. The example shown in Fig. 2, however, will be found convenient where there is but comparatively little ground-space.

In the operation the matter entering the receptacle 1 containing a considerable amount of ammonia or other gas will liquefy all solid and vegetable matter, which will mingle with the other liquid or water and pass off to the cesspools, as before mentioned. The cesspool, it will be understood, is used in connection with the sanitary receptacle, so as to insure the entire purification and liquefaction of the solid matter.

Have thus described our invention, we claim as new and desire to secure by Letters Patent—

1. The combination with a sanitary receptacle and a pipe leading therein, of a cesspool consisting of an inner chamber and an outer chamber, the walls of said chambers being adapted for the discharge of liquid through the same, a pipe leading from the receptacle into the inner chamber, and a siphon leading from said inner chamber into the outer chamber, substantially as specified.

2. The combination with a sanitary receptacle and a pipe leading therein, of a cesspool consisting of an inner chamber and an outer chamber, the walls of said chambers being adapted for the discharge of liquid through the same, a pipe leading from the receptacle into the inner chamber, a siphon leading from said inner chamber into the outer chamber, and a pipe leading from the outer chamber into the ground, substantially as specified.

3. The combination with a practically air and gas tight sanitary receptacle and a valved pipe leading therein, of a cesspool, having a porous wall, a discharge-pipe leading from the receptacle into said cesspool, and a pipe of porous material leading from said cesspool into the ground, substantially as specified.

In testimony whereof we have signed our names to this specification in the presence of two subscribing witnesses.

JOHN FRANCIS McCOY.
THOMAS NEELY GILMORE.

Witnesses:
JOSEPH BATSON MORRISS,
DANIEL PETER MARCY.